UNITED STATES PATENT OFFICE.

JOHN SENN, OF EVANSVILLE, ILLINOIS.

IMPROVEMENT IN HOG-CHOLERA COMPOUNDS.

Specification forming part of Letters Patent No. 205,147, dated June 18, 1878; application filed May 13, 1878.

*To all whom it may concern:*

Be it known that I, JOHN SENN, of Evansville, in the county of Randolph and State of Illinois, have invented a new and Improved Medical Compound; and I do hereby declare that the following is a full, clear, and exact description of the same.

My invention relates to a new remedy for hog-cholera, which is also efficacious in diseases of the lungs, with which hogs are often affected.

The remedy is a compound whose components and their proportions are as follows: Take, water, one and a half gallon; white-oak bark, one pound; wild-cherry-tree bark, one pound; poke-root, one-half pound; glue, two ounces; chalk, one ounce; copperas, twenty grains; sugar of lead, six grains; opium, two grains.

The first four ingredients—to wit, water, white-oak bark, cherry-tree bark, and poke-root—are placed together in a suitable vessel and boiled therein until the aggregate quantity has been reduced to one gallon. The solution is then strained and the remaining ingredients added—to wit, the glue, chalk, copperas, sugar of lead, and opium. This mass is heated to the boiling temperature, and when cool is ready for use.

In administering the remedy to hogs attacked by cholera, one pint of the compound may be taken as an average dose. This I mix with corn-meal mush, and administer it three times daily—*i. e.*, three pints a day for five days. The result is almost invariably a complete cure.

For disease of the lungs, the same quantity may be given in severe cases as in cholera, and the dose diminished as the disease becomes less active.

What I claim is—

The medical compound for cure of hog-cholera consisting of the following ingredients, in the proportions named, to wit: water, one and a half gallon; white-oak bark, one pound; wild-cherry-tree bark, one pound; poke-root, one-half pound; glue, two ounces; chalk, one ounce; copperas, twenty grains; sugar of lead, six grains; and opium, two grains, as described.

JOHN SENN.

Witnesses:
BOLTON DYER,
SAML. T. CROZIER.